G. H. GILMAN.
COMBINED CHUCK AND DRILL EXTRACTOR.
APPLICATION FILED MAY 16, 1913.
1,275,164.
Patented Aug. 6, 1918.
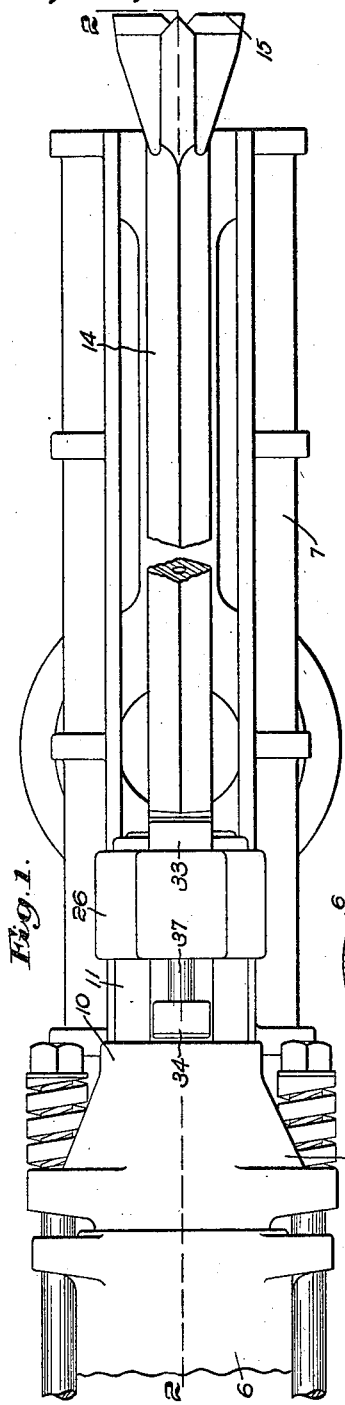
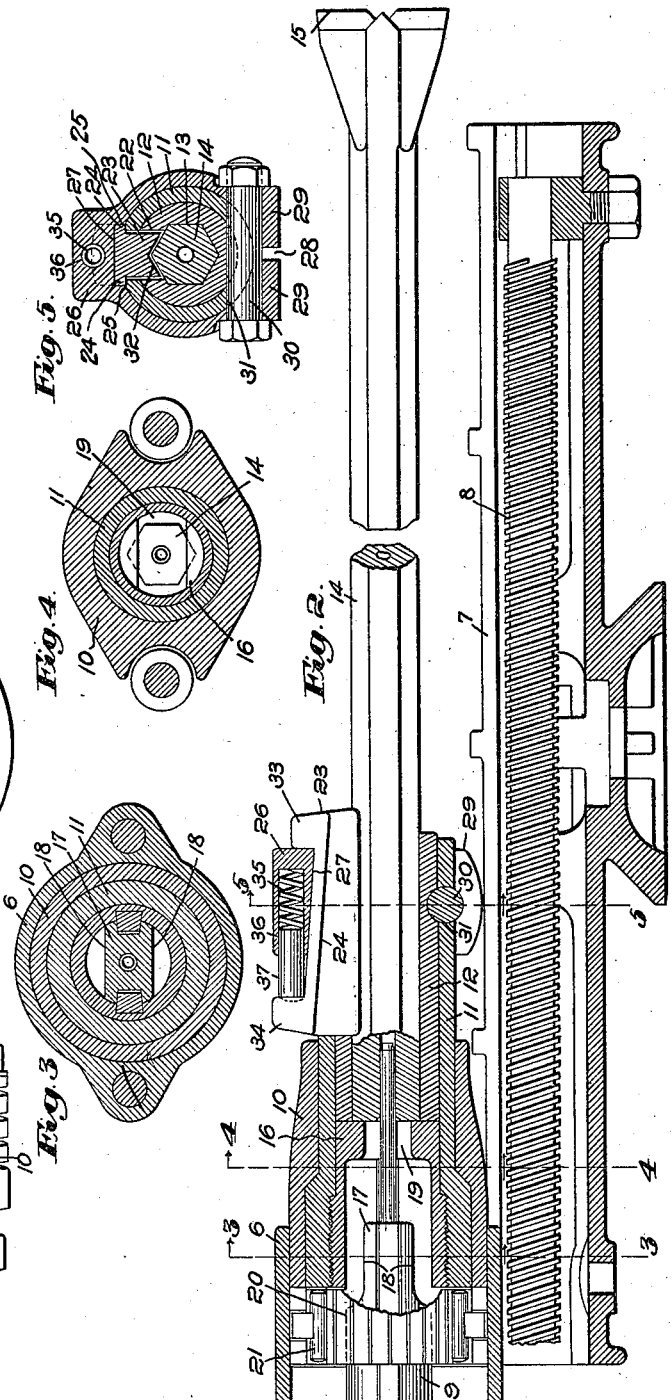
Witnesses:
Horace A. Crossman.
Carl L. Choate.
Inventor:
George H. Gilman.
by Emery Booth Janney Varney Attys

UNITED STATES PATENT OFFICE.

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

COMBINED CHUCK AND DRILL EXTRACTOR.

1,275,164.  Specification of Letters Patent.  Patented Aug. 6, 1918.

Application filed May 16, 1913.  Serial No. 767,974.

*To all whom it may concern:*

Be it known that I, GEORGE H. GILMAN, a citizen of the United States, and a resident of Claremont, Sullivan county, State of New Hampshire, have invented an Improvement in Combined Chuck and Drill Extractors, of which the following description, in connection with the accompanying drawings, is a specification, like characters on the drawings representing like parts.

This invention relates to tool retainers for retaining the tool, or die, in tools of the piston hammer type, and more especially, though not exclusively, to a combined chuck and drill extractor intended more particularly for use with drill steels having a shank portion of uniform cross section and sometimes called shankless drill steels.

My invention will be best understood by reference to the following specification, when taken in connection with the accompanying drawings of one illustrative embodiment thereof, while its scope will be more particularly pointed out in the appended claims.

In the drawings:

Figure 1 is a plan of a portion of a rock drill of the hammer type embodying my invention;

Fig. 2 is a sectional view on line 2—2 of Fig. 1;

Fig. 3 is a sectional view on line 3—3 of Fig. 2, looking toward the right;

Fig. 4 is a sectional view on line 4—4 of Fig. 2, looking toward the right; and

Fig. 5 is a sectional view on line 5—5 of Fig. 2, looking toward the right.

Referring to the drawings, and to the embodiment of my invention which I have selected for illustrative purposes, I have there shown the forward portion of a rock drill of the hammer type embodying my invention, the same comprising a cylinder 6, mounted in guideways of a shell 7 of common form, and provided with a usual feed-screw 8. It will be understood, however, that this invention is not limited to hammer drills of the mounted type, but is useful in all other types of hammer drills. A hammer piston 9 is mounted to reciprocate in the cylinder 6, and the latter is provided with a front cylinder head 10, in which a chuck 11 is mounted to rotate. This chuck has a bushing 12, provided with a polygonal hole or perforation 13, to receive a drill steel 14 of corresponding cross sectional shape, having at its forward end usual cutting edges 15. Herein, the drill steel is formed of hexagonal bar stock, but it will be understood that any suitable form of drill steel may be employed.

As a means for limiting the inward motion of the drill steel within the chuck, the latter may be provided with an abutment comprising two oppositely placed shoulders 16, and the striking end of the hammer piston 9 is provided with a reduced portion 17, having its opposite sides slabbed off at 18 to enter the aperture 19 between the shoulders 16, and thus deliver its blows against the inner end of the drill steel. Preferably, the chuck is provided with suitable tool rotating mechanism, such for example as that shown in my Patent No. 1,034,010, dated July 30, 1912. In this patent, the chuck is rotated by means of a chuck ring and ratchet mechanism operated by straight and helical flutes on the hammer piston, the reciprocatory motion of the latter being utilized to impart a step by step rotative movement to the chuck through a clutch ring and rollers. A complete illustration of the rotating mechanism is not essential to my present invention, and I have therefore shown simply a clutch ring 20, provided with rollers 21.

The drill steel 14 is normally loosely held in the chuck bushing 12, so as to be capable of unlimited outward movement, and during the operation of the tool is struck upon its inner end by the hammer piston in the customary manner, thereby acting upon the rock with a percussive cutting action, and being rotated step by step.

As a means for securing the drill steel in the chuck when it becomes necessary to remove the steel from the drill hole, I may provide any suitable means at will to secure the drill steel to its holding means, but herein I have provided the chuck 11 and chuck bushing 12 with a longitudinal slot 22 to receive a wedge 23. This wedge may be of any other suitable form, but herein it is provided with inclined laterally projecting shoulders 24 mounted upon inclined guideways 25, formed on the chuck 11. A ring, or collar, 26 encircling the chuck at its forward end is provided with a guideway 27, parallel to the guideways 25, thus forming opposite guideways inclined forwardly and inwardly toward the adjacent side of the tool. The collar 26 may be held in fixed position by any other suitable means, but herein is split at 28, and is provided with a pair of ears 29, through which a bolt or stud 30 passes, while the chuck 11 and its bushing 12 are laterally recessed at 31 to receive the bolt or stud, the latter thus interlocking therewith, and being held against movement longitudinally of the tool.

If desired, the wedge might engage only one of the flat faces of the drill steel 14, but herein is provided with a V-shaped groove 32, adapted to fit two adjacent angularly disposed faces of the drill steel (see Fig. 5). It will now be evident that when the wedge is retracted, as shown in Fig. 2, the wedge will clear the drill steel, as shown in Fig. 5, and will allow the latter free play within the chuck. When, however, the wedge is driven forward, it may be caused to grip the drill steel firmly, thus permitting the operator to extract the drill steel from the hole by the use of the feed screw. It will also be seen that, when the wedge is in its forward or gripping position, any tendency to outward movement of the drill bit, and consequently of the wedge, with respect to the drill chuck, will cause said wedge to engage the drill steel with an increased pressure, thereby automatically increasing the holding power of said wedge.

I preferably employ suitable means normally to hold the wedge in its rearmost position, so that it shall normally be ineffective to grip the steel. While I may employ any other suitable means for this purpose, herein the wedge is provided adjacent its front and rear ends respectively with lugs 33 and 34, the former serving to limit the rearward movement of the wedge, while the lug 34 serves to receive the thrust of a spring 35 tending constantly to move the wedge lengthwise out of engagement with the tool. While the spring may be of any other suitable form or arrangement, herein it is in the form of a helically coiled spring, located in a recess 36 provided in the collar 26. The spring might, of course, bear directly against the lug 34, but preferably I provide a pin 37, slidably arranged within the recess 36, and abutting at its rear end against the lug 34. The latter may serve to receive the blows of a hammer, whereby the wedge is driven forward by the operator against the tension of the spring 35, and is thus caused to clamp the drill steel rigidly in the chuck bushing. After the drill steel has been backed out of the drill hole, the drill steel may be removed by simply striking the wedge at its front end, and driving it rearwardly, whereupon it will be held in its rearmost position by the described spring, and the drill steel may be freely withdrawn.

While I have herein shown and described one form of my invention for illustrative purposes, and have disclosed and discussed in detail the construction and arrangement incidental to one specific application thereof, it is to be understood that the invention is limited neither to the mere details or relative arrangement of parts, nor to its specific embodiments herein shown, but that extensive deviations from the illustrated form or embodiment of the invention may be made, without departing from the principles thereof.

Having thus described my invention, what I claim and desire by Letters Patent to procure is:—

1. The combination, in a rock drilling machine, of a drill bit having a shank of uniform section, means for hammering the rear end of said drill bit, means for loosely holding said drill bit to permit the same normally to be moved endwise, and means to secure said drill bit to said holding means and having provision rendered effective by said drill-bit automatically to increase the holding power of said drill-bit securing means.

2. An apparatus of the class described, comprising, in combination, a percussive tool, means for holding the tool while normally permitting the same to be withdrawn freely, means for hammering the rear end of the tool, and means at will to prevent said tool from being withdrawn, the last mentioned means having provision for causing any outward tendency of said tool to increase the effectiveness to prevent such withdrawal.

3. An apparatus of the class described, comprising, in combination, a percussive tool, means for holding said tool while normally permitting the same to be withdrawn freely, means for hammering the rear end of the tool, and axially movable frictional means at will to secure said tool in said holding means.

4. An apparatus of the class described, comprising, in combination, a percussive tool, means for holding said tool while normally permitting the same to be withdrawn freely, means for hammering the rear end of said tool, means at will to secure said tool, and yielding means constantly tending to render the last-mentioned means ineffective to secure the tool.

5. An apparatus of the class described, comprising, in combination, a percussive tool, means for holding said tool while normally permitting the same to move longitudinally, means for hammering the rear end of said tool, means comprising a wedge for securing the tool against endwise movement, and means normally to hold said wedge in non-securing position.

6. An apparatus of the class described, comprising in combination, a percussive tool, means for loosely holding said tool, means for hammering the rear end of said tool, means comprising a forwardly tapered wedge for gripping the tool, and a spring normally urging said wedge rearwardly.

7. An apparatus of the class described, comprising, in combination, a percussive tool, means for loosely holding said tool, means for hammering the rear end of said tool, means forming guideways inclined with respect to the side of the tool, and a wedge mounted to slide in said guideways into and out of position to secure the tool.

8. An apparatus of the class described, comprising, in combination, a percussive tool, a tool holding chuck in which the tool is loosely mounted for endwise movement in the normal operation of the tool, said chuck being provided with a longitudinal slot, and a wedge mounted in said slot and engageable with said tool to secure the same in said chuck.

9. An apparatus of the class described, comprising, in combination, a percussive tool, a tool-holding chuck in which said tool is mounted for endwise movement in the normal operation of the tool, said chuck being provided with a longitudinal slot and with a guideway inclined forwardly and inwardly toward said tool, a collar secured to said chuck and provided with a guideway parallel to the first-mentioned guideway, a wedge mounted to slide in said guideways, and means for holding said wedge in a rearward position.

10. An apparatus of the class described comprising, in combination, a percussive tool, a tool-holding chuck in which said tool is mounted for endwise movement in the normal operation of the tool, said chuck being provided with a longitudinal slot and with a guideway inclined forwardly and inwardly toward said tool, a collar secured to said chuck and provided with a guideway parallel to the first-mentioned guideway, a wedge mounted to slide in said guideways and provided with lugs adjacent its front and rear ends, respectively, at opposite sides of said collar, said collar being provided with a spring chamber, a pin mounted to slide in said chamber, and a spring in said chamber arranged to exert a rearward pressure on said pin.

11. The combination, in a rock drilling machine, of means for loosely holding a drill bit to permit the same normally to be moved endwise, and means to secure said drill bit to said holding means and having provision rendered effective by said drill bit automatically to increase the holding power of said drill bit securing means.

12. The combination, in a machine of the character described, of means for loosely holding a percussive tool to permit the same normally to be moved endwise, an axially movable wedge for securing said tool against endwise movement, and a spring for normally holding said wedge in non-securing position.

In testimony whereof I have signed my name to this specification in the presence of two subscribing witnesses.

GEORGE H. GILMAN.

Witnesses:
WILLIAM E. HALE,
M. ALEX. RICE.